United States Patent
Cheng et al.

(10) Patent No.: US 10,024,404 B2
(45) Date of Patent: Jul. 17, 2018

(54) CONTINUOUSLY VARIABLE TRANSMISSION WITH CONE DISCS

(71) Applicant: Yue Cheng, Liaoning (CN)

(72) Inventors: Naishi Cheng, Liaoning (CN); Yue Cheng, Liaoning (CN)

(73) Assignee: Changzhou Dongfeng Continuously Variable Transmission Co., Ltd., Changzhou, Jiangsu (CN)

( * ) Notice: Subject to any disclaimer, the term of this patent is extended or adjusted under 35 U.S.C. 154(b) by 32 days.

(21) Appl. No.: 15/127,278

(22) PCT Filed: Dec. 31, 2014

(86) PCT No.: PCT/CN2014/095737
§ 371 (c)(1),
(2) Date: Sep. 19, 2016

(87) PCT Pub. No.: WO2015/139502
PCT Pub. Date: Sep. 24, 2015

(65) Prior Publication Data
US 2017/0159777 A1 Jun. 8, 2017

(30) Foreign Application Priority Data

Mar. 20, 2014 (CN) .......................... 2014 1 0106539
Mar. 20, 2014 (CN) ..................... 2014 2 0129364 U

(51) Int. Cl.
*F16H 55/56* (2006.01)
*F16H 55/36* (2006.01)
(Continued)

(52) U.S. Cl.
CPC ........... *F16H 9/18* (2013.01); *F16H 25/2204* (2013.01); *F16H 55/56* (2013.01); *F16H 61/662* (2013.01)

(58) Field of Classification Search
CPC ................. F16H 55/56; F16H 61/6625; F16H 61/66272; F16H 9/12; F16H 13/14
(Continued)

(56) References Cited

U.S. PATENT DOCUMENTS 3,279,270 A * 10/1966 Pacak ..................... F16H 55/56
474/19
3,616,706 A * 11/1971 Shimamoto ............. F16H 55/56
474/19
(Continued)

FOREIGN PATENT DOCUMENTS

CN 2254971 Y 5/1997
CN 101410650 A 4/2009
(Continued)

*Primary Examiner* — Henry Y Liu
(74) *Attorney, Agent, or Firm* — Muncy, Geissler, Olds & Lowe, P.C.

(57) ABSTRACT

A variable transmission includes driving and driven cone discs respectively having two movable and pressing cone discs; a pressing mechanism having an end surface cam pressing mechanism arranged on the back of one pressing cone disc of the driving and driven pressing cone discs; a ratio control mechanism having a ratio control shaft, hollow screws and nuts, arranged on the backs of the driving and driven movable cone discs and adopt ball screw structures or sliding screw structures; the ratio control shaft and a constant ratio transmission mechanism enable the conversion relationships between the rotation of the speed control shaft and the axial sliding of the driving and driven movable cone discs are be equal to each other to ensure the transmission shafts of the driving and driven movable cone discs move axially and synchronously at the same speed and in the same direction.

16 Claims, 4 Drawing Sheets

(51) Int. Cl.
*F16H 59/00* (2006.01)
*F16H 61/00* (2006.01)
*F16H 63/00* (2006.01)
*F16H 9/18* (2006.01)
*F16H 25/22* (2006.01)
*F16H 61/662* (2006.01)

(58) Field of Classification Search
USPC .................................................. 474/10, 19
See application file for complete search history.

(56) References Cited

U.S. PATENT DOCUMENTS

| | | | | | |
|---|---|---|---|---|---|
| 3,699,827 | A | * | 10/1972 | Vogel | F16H 9/12 |
| | | | | | 474/12 |
| 3,722,308 | A | * | 3/1973 | Steuer | F16C 19/50 |
| | | | | | 474/19 |
| 4,026,161 | A | * | 5/1977 | Vogel | F16H 55/56 |
| | | | | | 474/19 |
| 4,196,641 | A | * | 4/1980 | Vogel | F16H 9/16 |
| | | | | | 474/19 |
| 5,184,981 | A | * | 2/1993 | Wittke | F16H 61/66272 |
| | | | | | 474/18 |
| 6,336,878 | B1 | * | 1/2002 | Ehrlich | F16H 55/56 |
| | | | | | 474/18 |
| 6,379,274 | B1 | * | 4/2002 | Robert | F16H 55/56 |
| | | | | | 474/12 |
| 6,406,390 | B1 | * | 6/2002 | Roby | F16H 55/56 |
| | | | | | 474/12 |
| 6,733,406 | B2 | * | 5/2004 | Kitai | F16H 55/56 |
| | | | | | 474/13 |
| 6,743,129 | B1 | * | 6/2004 | Younggren | F16H 55/56 |
| | | | | | 474/17 |
| 7,037,226 | B2 | * | 5/2006 | Zulawski | F16H 55/56 |
| | | | | | 474/19 |

FOREIGN PATENT DOCUMENTS

| | | |
|---|---|---|
| CN | 201344234 Y | 11/2009 |
| CN | 201875074 U | 6/2011 |
| CN | 102278436 A | 12/2011 |
| CN | 103867678 A | 6/2014 |
| CN | 203770563 U | 8/2014 |
| DE | 3028490 A1 | 6/1982 |
| DE | 4036683 A1 | 5/1991 |
| DE | 10139119 A1 | 3/2002 |
| DE | 102006018806 A1 | 10/2007 |
| JP | 10-184840 A | 7/1998 |

* cited by examiner

CONTINUOUSLY VARIABLE TRANSMISSION WITH CONE DISCS

BACKGROUND OF THE INVENTION

1. Field of the Invention

The present invention relates to a transmission, more particular to a continuously variable transmission with cone discs.

2. The Prior Arts

A continuously variable transmission with cone discs (hereinafter referred to as CVT) transmits power and rotation frictionally through a flexible transmission assembly clamped between the cone discs, such as rubber belts, push belts, or chains (hereinafter referred to as belts). CVTs are widely used in vehicles, construction machinery and other power machinery. The pressing system generates appropriate frictional force between the cone discs and the belts, while the ratio control system realizes an appropriate transmission ratio.

Since the appearance of CVTs, the technical development pursuits always high efficiency, wide ratio range, high reliability and compact structure.

The first engineered and the most commonly used at current are CVTs of which pressing and ratio control are controlled by two sets of hydraulic systems arranged on two movable cone discs, and the hydraulic control systems realize pressing and ratio control functions. The hydraulic pressing system in the CVT reacts and actuates relative slow, and cannot follow the transient change of external loads in real time, which often causes damage of CVT. In order to ensure the functionality and the reliability of the system, the system hydraulic pressing force is generally designed much higher than actually needed, which causes low efficiency, high constructional loads, short life cycle, and low reliability. The system cannot respond to transient change of external loads, and besides, energy consumption and the machining costs of the hydraulic system are high.

In order to overcome the shortages of the hydraulic pressing and ratio control systems, one German company Luk discloses a real-time pressing method (which is applied in Audi's Multitronic Transmissions in a large scale) for movable cone discs using cams and hydraulic systems in Patents DE 000004036683, DE 102006018806, and Patent CN 200780010525.1. According to the method, in the hydraulic system, one slope surface forming the end surface cam is rigidly connected with the transmission shaft of the movable cone disc, and another cam is connected with a hydraulic piston; rollers are arranged between the two slope surfaces which generate torque-related axial force through the rollers between the two slope surfaces, and the axial force is added to hydraulic pressing force in the hydraulic piston. According to the pressing manner, pressing force can respond to the transient change of loads, so that the hydraulic system pressing force requirements of pump, and resulted energy consumption can be reduced, and requirements for performance of the hydraulic pump can be reduced. However, the sliding range of the cam with engineering considerations (amount and working radius of slopes, etc.) is smaller than the axial sliding (about 15-20 mm) required for ratio control of the movable cone disc, the method can only work in combination with the hydraulic system in CVT, but cannot be separately used as a pressing mechanism.

LuK discloses a spatial cam structure for directly pressing the movable cone disc in Patent DE 000010139119. Such structure also has the problem to provide the enough axial sliding space required for ratio control of the movable cone disc because the spatial cam is still arranged on one side of the movable cone disc. The only solution of the problem is to enlarge the axial dimension of the cam. In many applications, especially in vehicle applications, the dimension is a key parameter of transmission; secondly, the spatial cam has a radial slope angle less than the friction self-locking angle, so that the cam can be self-locked and cannot slide while the movable cone disc slides away from the pressing cone disc; in addition, when the input torque is reversing, like the vehicle coasts down and the engine turns to be driven, the rollers are going to slide to the other side of the slope. If the cam is too large, the rollers need much more time to slide, so that the belt slides, and the surfaces of cone discs can be damaged; furthermore, the spatial cam structure does not have forward and reverse pressing functions without considering the forward and reverse pressing problems.

One German Company PIV discloses a structure for pressing a stationary cone disc by using an end surface cam through a hydraulic system in DE 3028490. The pressing system adopting such structure is still a hydraulic system, wherein a main pressing cylinder is positioned on the backs of driving and driven movable cone discs, and besides, a hydraulic cylinder is arranged on the back of a driving stationary cone disc, and the end surface cam is connected with the other end of the hydraulic cylinder and the transmission shaft. The main pressing cylinder provides pressing force during normal operation, only in case of sudden load changes, the cam on the back of the driving stationary cone disc compresses the hydraulic cylinder rapidly, to increase the hydraulic pressing force to prevent sliding. Therefore, such structure has the same shortages, the pressing and ratio control are on the same movable cone disc.

To solve the problems existing in the hydraulic pressing system, the pressing system using disc spring and ratio control using screw and electric motor are disclosed in recent years. Such CVTs are simple in structures, but have the shortage that pressing force is determined by disc springs and irrelevant with load; besides, the disc spring pressing mechanism and a screw ratio control mechanism are mounted on one side of the movable cone disc, and the transmission structure is not compact enough.

In order to overcome the shortages of disc spring pressing and screw ratio control, Patent CN 201875074U discloses a CVT with cone discs by using the screw pressing system. The CVT with cone discs comprises a pair of driving cone discs mounted on a driving shaft and a pair of driven cone discs mounted on a driven shaft; the driving cone discs and the driven cone discs clamp a flexible transmission element. The pressing mechanism of the CVT with cone discs consists of pressing screws and pressing nuts, which are mounted on the backs of driving movable cone discs and are in screw fit. A ratio control mechanism consists of hollow screws and nuts, which are arranged on the backs of the driving movable cone discs. The hollow screws and nuts adopt ball screw structures or sliding screw structures, and one of the hollow screws and nuts is fixedly connected with the driving movable cone discs, with ratio control gears on outer walls. A ratio control motor controls the ratio through a speed reducer and ratio control gears on the hollow screws or nuts. The CVT with cone discs has the following advantages that: pressing force applied to the cone discs by the pressing mechanism can be adjusted in real time along with the changes in torque born by the transmission: when the transmitting torque is reduced, the pressing force is also reduced, thereby improving the transmitting efficiency of the CVT, reducing the loads of each component, and facilitating prolonging the service life of the system; besides, the transmission is simple in structure, and low in energy consumption and machining costs. However, the CVT also has shortages and deficiencies that, firstly, the ratio control mechanism and the pressing mechanism are mounted on the same movable cone disc, so that the pressing mechanism also needs to meet the requirement of axial sliding for ratio control of the movable cone disc, resulting in large axial dimension and no-compact structure of the transmission; secondly, the pressing mechanism can only achieve one-way pressing without transmitting torque in a reverse direction, so that the CVT can only be applied in the case of transmitting motion and torque in a unidirectional manner.

SUMMARY OF THE INVENTION

The present invention aims to provide a compact CVT with cone discs, capable of realizing two-way pressing, and adjusting pressing force according to the transmitted torque in real time, and with high efficiency, long system service life and high system reliability against the defects and the shortages existing in the prior art.

In order to achieve the purposes, the present invention provides a CVT with cone discs, comprising a pair of driving cone discs mounted on a driving shaft and a pair of driven cone discs mounted on a driven shaft, wherein a pair of driving cone discs and a pair of driven cone discs are respectively connected by splines, or ball keys, or any other manners that allow mutual axial sliding without mutual rotation of the two cone discs; the driving cone discs and the driven cone discs clamp a flexible transmission element between them.

The pair of driving cone discs includes a driving movable cone disc and a driving pressing cone disc; the pair of driven cone discs includes a driven movable cone disc and a driven pressing cone disc; the back of the cone and flexible element pressing surface of at least one pressing cone disc between the driving and the driven pressing cone discs is provided with an end surface cam pressing mechanism; the end surface pressing mechanism comprises a driving cam and a driven cam which are axially and oppositely arranged, wherein the driving cam and a corresponding transmission shaft (driving shaft or driven shaft) can be fixedly connected (including being integrated into a whole), or connected by a spline, a ball key or a flat key, or any other manners allowing mutual axial sliding without mutual rotation, while the driven cam and a corresponding transmission shaft (driving shaft or driven shaft) can be connected fixedly, or connected by a spline, a ball key or a flat key, or any other manners allowing mutual axial sliding without mutual rotation; the pressing cone disc (driving pressing cone disc and/or driven pressing cone disc) of which the back is provided with the end surface cam pressing mechanism is connected with the corresponding transmission shaft (driving shaft or driven shaft) in such way, which allows both mutual axial sliding within circa 1 mm and mutual rotation; the pressing cone disc (driving pressing cone disc or driven pressing cone disc) of which the back is not provided with an end surface cam pressing mechanism is fixedly connected with the corresponding transmission shaft (driving shaft or driven shaft).

The CVT with cone discs is provided with a ratio control mechanism which drives the transmission shafts of the driving movable cone disc and the driven movable cone disc to slide axially and synchronously at the same speed and in the same direction.

The ratio control mechanism comprises a ratio control shaft, as well as hollow screws and nuts, which are respectively arranged on the backs of the driving movable cone disc and the driven movable cone disc; the driving shaft and the driven shaft are respectively placed in the hollow screws; the hollow screws and the nuts are connected in the manners of ball screws or sliding screws; one of the hollowing screw and the nut is connected with the corresponding movable cone disc (driving movable cone disc or driven pressing cone disc) through a bearing capable of bearing axial and radial loads, while the other of the hollowing screw and the nut is connected with the corresponding transmission shaft (driving shaft or driven shaft) through a bearing capable of bearing axial and radial loads; one of the hollowing screw and the nut is connected with the corresponding movable cone disc (driving movable cone disc or driven pressing cone disc) through a bearing capable of bearing axial and radial loads, while the other of the hollowing screw and the nut is connected with the corresponding transmission shaft (driving shaft or driven shaft) through a bearing capable of bearing axial and radial loads; one of the hollow screw and the nut is connected with the transmission housing in the manner allowing axial sliding without mutual rotation, while the other of the hollow screw and the nut is connected with a ratio control shaft through a constant ratio transmission mechanism; one of the hollow screw and the nut is connected with the transmission housing in the manner allowing axial sliding without mutual rotation, while the other of the hollow screw and the nut is connected with a ratio control shaft through a constant ratio transmission mechanism, so that the conversion relationship i1 between the rotation of the ratio control shaft and the axial sliding of the driving movable cone disc is equal to the conversion relationship i2 between the rotation of the ratio control shaft and the axial sliding of the driven movable cone disc (i is turns of the ratio control shaft/axial sliding distance of the movable cone disc).

The driving cam and the driven cam of the end surface cam pressing mechanism comprise one of the two following forms:

1) the axially and oppositely arranged end surfaces of the driving cam and the driven cam are respectively provided with two or more circumferential V-shaped raceways each of which comprises a forward pressing section and a reverse pressing section which are interconnected; the driving cam and the driven cam correspond with each other by a rolling body between the corresponding raceways of the driving cam and the driven cam; and 2) the axially and oppositely arranged end surfaces of the driving cam and the driven cam are respectively provided with two or more circumferential V-shaped pressing surfaces each of which comprises a forward pressing surface and a reverse pressing surface which are interconnected.

A needle bearing, which is arranged between the inner hole of the pressing cone disc and the transmission shaft, is mounted between the pressing cone disc (driving pressing cone disc and/or driven pressing cone disc) of which the back is provided with the end surface cam pressing mechanism and the corresponding transmission shaft (driving shaft or driven shaft).

An elastic axial pressing element is arranged between the end surface cam pressing mechanism and the corresponding pressing cone disc, or between the end surface cam pressing mechanism and the corresponding transmission shaft.

Compared with the prior art, the present invention has the beneficial effects that:

1. The end surface cam pressing mechanism is spatially separated from the ratio control mechanism, and specifically, the pressing mechanism is not mounted on the ratio control cone disc and does not need to be matched with the axial sliding of the movable cone disc, so that the axial dimension of the pressing mechanism can be reduced, and the CVT is compact in structure;

2. The end surface cam delivers pressing force in two directions (forward and reverse);

3. The pressing mechanism of the end surface cam converts input torque into axial force which corresponds with the transmitting torque, so that frictional transmission can be guaranteed; unnecessary overloads of the system can also be avoided, and prolonging the service life of the system is facilitated; besides, the input torque provides the axial force without additional energy, so that the efficiency of the system can be improved; the axial force changes in real time with sudden load changes, so as to prevent the flexible transmission element from sliding on the cone disc, and improve system reliability; and 4. The two hollow screws and nuts in the ratio control mechanism are transmitted through one ratio control shaft, so that the torque/force on ratio control shaft can be compensated with each other; therefore, the torque/force required for ratio control is reduced, and system loads and requirements for performance of the ratio control motor can be reduced.

BRIEF DESCRIPTION OF THE DRAWINGS

The drawings are schematic views of an embodiment of the present invention, wherein.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
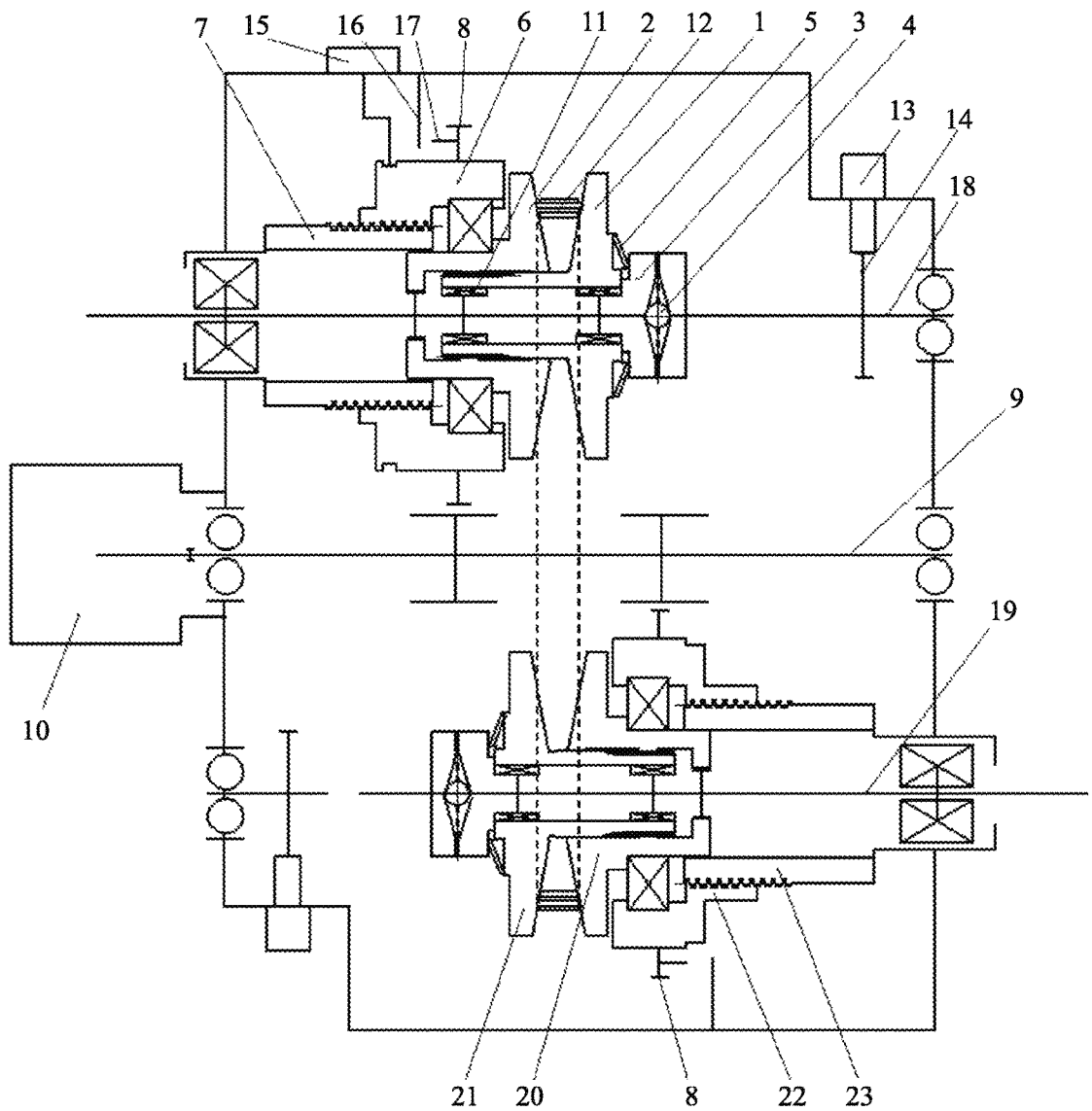
FIG. 1 is a structural schematic view of the embodiment.
Figure 2:
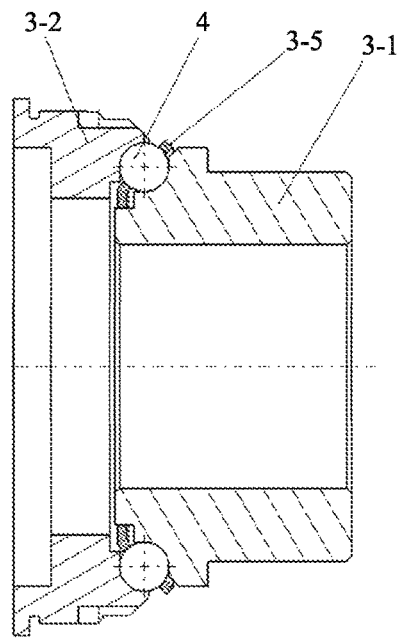
FIG. 2 is a longitudinal sectional view of an end surface cam pressing mechanism using a rolling body for transmission.
Figure 3:
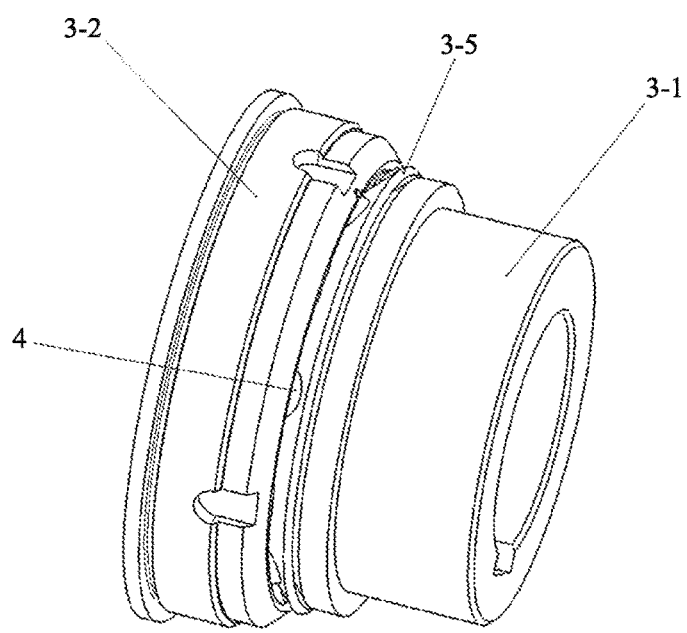
FIG. 3 is a perspective view of the end surface cam pressing mechanism of FIG. 2.
Figure 4:
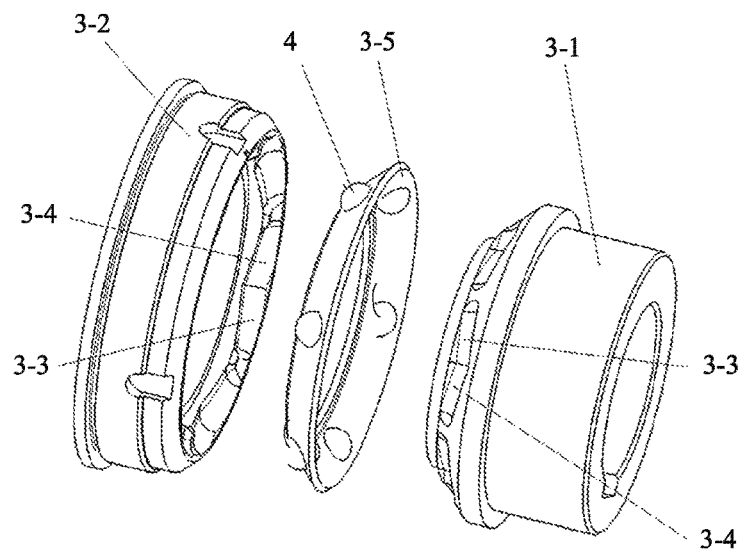
FIG. 4 is a split view of the end surface cam pressing mechanism of FIG. 2.

Referring to FIG. 1, in the CVT with cone discs of the present invention, driving cone discs consisting of a driving movable cone disc 2 and a driving pressing cone disc 1 are mounted on a driving shaft 18, and driven cone discs consisting of a driven movable cone disc 20 and a driven pressing cone disc 21 are mounted on a driven shaft 19 in parallel to the driving shaft 18; the driving cone discs and the driven cone discs clamp a flexible transmission element 12 which can adopt push belts, or metal belts or chains, or V-shaped belts for CVTs. The driving pressing cone disc and the driven pressing cone disc keep a connection relationship allowing both slight axial sliding within circa 1 mm and mutual rotation on the transmission shaft respectively with the corresponding driving shaft 18 and the driven shaft 19 through the needle bearing 11; the driving movable cone disc and the driven movable cone disc are respectively connected with the driving pressing cone disc and the driven pressing cone disc by splines, ball keys, or any other manners that allow mutual axial sliding without rotation. The backs (pressing end surfaces) of the driving pressing cone disc and the driven pressing cone disc are respectively provided with an end surface cam pressing mechanism 3. Each end surface cam pressing mechanism consists of a driving cam 3-1 and a driven cam 3-2 which are axially and oppositely arranged. The driving cam 3-1 and the driven cam 3-2 can be transmitted by a rolling body or a slope.

Figure 5:
FIG. 5 is an expanded view of raceways on the axially and oppositely arranged end surfaces of the driving cam and the driven cam in the end surface cam pressing mechanism of FIG. 2.

Referring to FIGS. 2-5, the axially and oppositely arranged surfaces of the driving cam and the driven cam of the end surface cam pressing mechanism using the rolling body for transmission are respectively provided with six circumferential V-shaped raceways (as shown in FIG. 5) each of which comprises a forward pressing section 3-3 and a reverse pressing section 3-4 which are interconnected; the raceways of the driving cam and the driven cam correspond to each other; the driving cam and the driven cam are matched with each other by rolling bodies 4 between the corresponding raceways; the six rolling bodies are positioned by a retainer 3-5 (to improve the reliability and assemblability of the system). The end surface cam pressing mechanism adopts the pressing principles that the torque is transmitted from the transmission shaft to the end surface cam pressing mechanism, thereby causing relative rotation between the two oppositely arranged end surfaces of the driving cam and the driven cam and the rolling bodies; since the positions of the pressing cone discs are limited by the ratio control movable cone discs and the flexible transmission elements, the driving cam and the driven cam convert torques applied to the operating radius of the rolling bodies into axial force required by friction transmission through their end surfaces and the rolling bodies. According to different directions of the torques, the driving cam and the driven cam achieve forward and reverse pressing through the opposite rotations of the rolling bodies on the forward and reverse pressing sections of the raceways.

Figure 8:
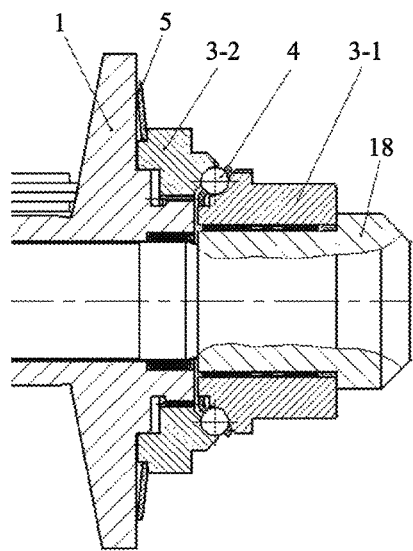
FIG. 8 is a schematic view of a connection manner of an end surface cam pressing mechanism using a rolling body for transmission.
Figure 9:
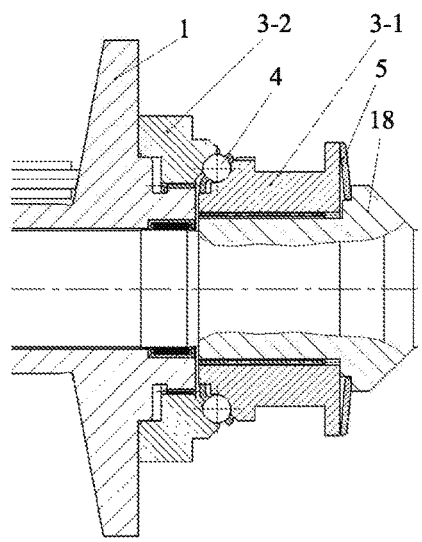
FIG. 9 is a schematic view of a second connection manner of an end surface cam pressing mechanism using a rolling body for transmission.
Figure 10:
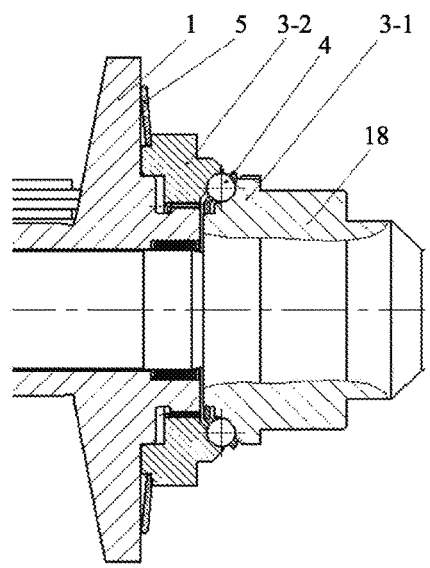
FIG. 10 is a schematic view of a third connection manner of an end surface cam pressing mechanism using a rolling body for transmission.
Figure 11:
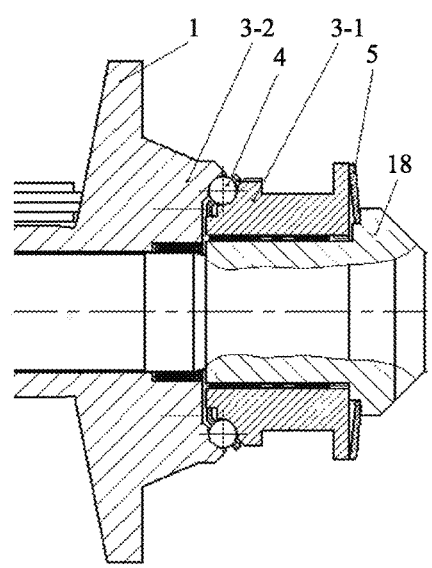
FIG. 11 is a schematic view of a fourth connection manner of an end surface cam pressing mechanism using a rolling body for transmission.

According to different machining and application conditions, the end surface cam pressing mechanism can at least adopt one of the following four connection manners:

In the first connection manner as shown in FIG. 8, the driving cam 3-1 and the corresponding transmission shaft can be in sliding splined connection, while the driven cam 3-2 and the corresponding pressing cone disc can be in sliding splined connection, with the disc spring 5 actuating on the driven cam; through the connection manner, the cam is convenient to machine, but a large number of parts are needed, leading to a large axial dimension;

In the second connection manner as shown in FIG. 9, the driving cam 3-1 and the corresponding transmission shaft can be in sliding splined connection, while the driven cam 3-2 and the corresponding pressing cone disc can be in sliding splined connection, with the disc spring 5 actuating on the driving cam; the connection manner is basically the same as the first connection manner, except that the disc spring acts on the driving cam, so that the size of the disc spring can be reduced, and the centrifugal force during rotation is small;

In the third connection manner as shown in FIG. 10, the driving cam 3-1 and the corresponding transmission shaft are fixedly connected, while the driven cam 3-2 and the corresponding pressing cone disc can be in sliding splined connection, with the disc spring 5 actuating on the driven cam; through the connection manner, cam pressing raceways can be directly processed on the transmission shafts, enabling a compact and reliable structure, but high machining difficulty; and In the fourth connection manner as shown in FIG. 11, the driving cam 3-1 and the corresponding transmission shaft can be in sliding splined connection, while the driven cam 3-2 and the corresponding pressing cone disc are fixedly connected, with the disc spring 5 actuating on the driving cam; the fourth connection manner is the same as the third connection manner, cam curved surfaces are directly processed on the pressing cone discs, enabling a compact and reliable structure, but high machining difficulty of cam.

In the four connection manners, the disc spring is used as an elastic axial pressing element by the end surface cam pressing mechanism for providing pretension pressing force to the pressing cone disc; besides, in the moment of switching between forward and reverse pressing, the disc spring is used for pressing the two cams tightly so as to prevent the rolling body from being dislocated between the loose cams.

The end surface cam pressing mechanism using the rolling body for transmission has the advantages of less friction and high sensitivity.

Figure 6:
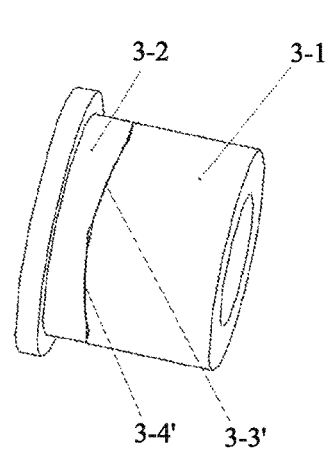
FIG. 6 is a perspective view of an end surface cam pressing mechanism using a slope for transmission.
Figure 7:
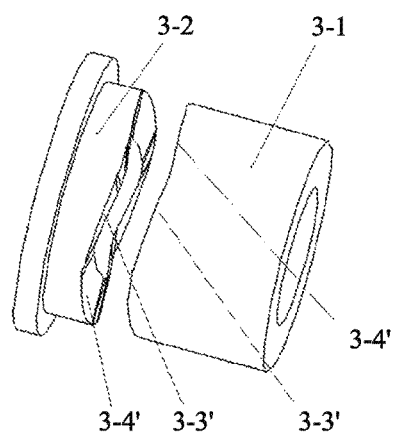
FIG. 7 is a split view of the end surface cam pressing mechanism of FIG. 6.

As shown in FIGS. 6 and 7, the axially and oppositely arranged end surfaces of the driving cam 3-1 and the driven cam 3-2 of the end surface cam pressing mechanism using the slope for transmission are respectively provided with two or more circumferential V-shaped pressing surfaces each of which comprises a forward pressing surface 3-3' and a reverse pressing surface 3-4' which are interconnected. The pressing principles are similar to those of the end surface cam pressing mechanism using the rolling body for transmission: the driving cam and the driven cam preform forward and reverse pressing according to different directions of the torque through the forward and reverse pressing surfaces.

The end surface cam pressing mechanism using the slope for transmission has the advantage of simple structure and has the disadvantages of great friction and low sensitivity.

By matching with the end surface cam pressing mechanism, the ratio control manner of the ratio control system of the CVT with cone discs is changed from controlling the axial sliding of only the driving movable cone disc to control the synchronous rotation of the driving movable cone disc and the driven movable cone disc.

As shown in FIG. 1, the hollow screw 7 and the nut 6 which are matched each other are arranged on the back of the driving movable cone disc 2, and the hollow screw 23 and the nut 22 which are matched each other are arranged on the back of the driven movable cone disc 20, the driving shaft and the driven shaft are respectively placed in the hollow screws, and the hollow screws and the nuts adopt ball screw structures; the hollow screws 7 and 23 are respectively connected with their corresponding driving movable cone disc and driven movable cone disc via bearings capable of bearing axial and radial loads, and directly connected with corresponding driving shafts and driven shafts; the nuts are connected with corresponding driving shafts and driven shafts through bearings capable of bearing axial and radial loads, with ratio control gears 8 arranged on the outer walls of the nuts. The ratio control motor 10 is connected with the ratio control shaft 9 through a speed reduction mechanism; the ratio control shaft is arranged in parallel with the driving shaft 18 and the driven shaft 19, and is provided with two gears (not shown) respectively meshed with the ratio control gears 8 on the two nuts; the two meshed gear sets form a constant ratio transmission mechanism, so that the conversion relationship it between the rotation of the ratio control shaft 9 and the axial rotation of the driving movable cone disc 2 is equal to conversion relationship i2 (i is turns of the ratio control shaft/axial rotation distance of the movable cone disc) between the rotation of the ratio control shaft 9 and the axial rotation of the driven movable cone disc 20.

The hollow screws and nuts can be connected in a rolling screw manner (not shown) with intermediate rolling bodies (such as balls), compared with an ordinary sliding screw connection manner, the rolling screw manner can reduce the torque required for ratio control, prolong the service life of screws and reduce requirements for performance of the ratio control motor. In order to reduce the volume and weight of the ratio control mechanism, as well as the space dimension for rotation of the ratio control mechanism, the rolling bodies between the hollow screws and nuts only slide in the raceways between the hollow screws and nuts; in order to ensure the ratio control distance of the ratio control mechanism and the rotation space of the rolling bodies, the effective operating length of the raceways between the hollow screws and nuts should be greater than the total length of all the rolling bodies. The hollow screws are connected with the transmission housing of the CVT by stopping pins (not shown) or other structures, mechanisms or parts, which can prevent rotation, but do not generate axial loads or axial positioning, to enclose the axial force of ratio control in the transmission shaft, so that the loads cannot be transmitted to the transmission housing of the CVT with relative-low strength, and cannot rotate with the ratio control mechanism; therefore, not only can a ratio control function be achieved, but also the effect of ratio control force on the transmission housing of the CVT is eliminated, improving reliability.

In order to provide control signals for an electrical control system (not shown), a rotational speed sensor 13 and a rotational speed signal generating device 14 can be arranged at appropriate positions respectively corresponding to the driving shaft and the driven shaft on the transmission housing of the CVT.

In order to prevent an actuating mechanism from exceeding the sliding range and endangering system security, the transmission housing of the CVT can also be provided with an angular displacement sensor 15 for measuring the sliding positions of the cone discs, and the probe (not shown) of the angular displacement sensor is connected with circumferential rolling grooves (not shown) formed in the nuts.

In order to ensure the safe operation of the CVT, ridged stopper mechanisms a16 can also be arranged on the ratio control gears 8 of the nut 6, and stopper mechanisms b17 matched with the stopper mechanisms a16 are arranged at the corresponding positions on the housing; when the axial sliding of the ratio control movable cone disc goes beyond the limit positions at two ends, the ratio control nuts cannot rotate any more under the actions of the stopper mechanisms a16 and the stopper mechanisms b17, so that safe operation of the ratio control mechanism is guaranteed.

What is claimed is:

1. A continuously variable transmission with cone discs, comprising a pair of driving cone discs mounted on a driving shaft and a pair of driven cone discs mounted on a driven shaft, wherein the pair of driving cone discs and the pair of driven cone discs are respectively connected by a manner that allow mutual axial sliding without mutual rotation of two cone discs; the driving cone discs and the driven cone discs clamp a flexible transmission element, wherein the pair of driving cone discs includes a driving movable cone disc and a driving pressing cone disc; the pair of driven cone discs includes a driven movable cone disc and a driven pressing cone disc; a back of the cone and flexible element pressing surface of at least one pressing cone disc between the driving and the driven pressing cone disc is provided with an end surface cam pressing mechanism; the end surface pressing mechanism comprises a driving cam and a driven cam which are axially and oppositely arranged, wherein the driving cam and a corresponding transmission shaft can be connected by a manner allowing mutual axial sliding without mutual rotation, while the driven cam and a corresponding transmission shaft can be connected by a manner allowing mutual axial sliding without mutual rotation; the pressing cone disc of which the back is provided with the end surface cam pressing mechanism is connected with the corresponding transmission shaft in such way, which allows both mutual axial sliding within circa 1 mm and mutual rotation; or the pressing cone disc of which the back is not provided with an end surface cam pressing mechanism is fixedly connected with the corresponding transmission shaft, and wherein the continuously variable transmission with cone discs is provided with a ratio control mechanism which drives the transmission shafts of the driving movable cone disc and the driven movable cone disc to axially slide synchronously at the same speed and in the same direction.

2. The continuously variable transmission with cone discs according to claim 1, wherein the ratio control mechanism comprises a ratio control shaft, as well as hollow screws and nuts, which are respectively arranged on the backs of the driving movable cone disc and the driven movable cone disc; the driving shaft and the driven shaft are respectively arranged in the hollow screws; the hollow screws and the nuts are connected in the manners of ball screws or sliding screws; one of the hollow screw and the nut is connected with the corresponding movable cone disc through a bearing capable of bearing axial and radial loads, while the other of the hollow screw and the nut is connected with the corresponding transmission shaft through a bearing capable of bearing axial and radial loads; one of the hollow screw and the nut is connected with the corresponding movable cone disc through a bearing capable of bearing axial and radial loads, while the other of the hollow screw and the nut is connected with the corresponding transmission shaft through a bearing capable of bearing axial and radial loads; one of the hollow screw and the nut is connected with the transmission housing in the manner allowing axial sliding without mutual rotation, while the other of the hollow screw and the nut is connected with a ratio control shaft through a constant ratio transmission mechanism; one of the hollow screw and the nut is connected with the transmission housing in the manner allowing axial sliding without mutual rotation, while the other of the hollow screw and the nut is connected with a ratio control shaft through a constant ratio transmission mechanism, so that the conversion relationship i1 between the rotation of the ratio control shaft and the axial sliding of the driving movable cone disc is equal to the conversion relationship i2 between the rotation of the ratio control shaft and the axial sliding of the driven movable cone disc.

3. The continuously variable transmission with cone discs according to claim 1, wherein the driving cam and the driven cam of the end surface cam pressing mechanism comprises one of the two following forms:

1) the axially and oppositely arranged end surfaces of the driving cam and the driven cam are respectively provided with two or more circumferential V-shaped raceways each of which comprises a forward pressing section and a reverse pressing section which are interconnected; the driving cam and the driven cam correspond with each other by a rolling body between the corresponding raceways of the driving cam and the driven cam; and 2) the axially and oppositely arranged end surfaces of the driving cam and the driven cam are respectively provided with two or more circumferential V-shaped pressing surfaces each of which comprises a forward pressing surface and a reverse pressing surface which are interconnected.

4. The continuously variable transmission with cone discs according to claim 1, wherein a needle bearing, which is arranged between the inner hole of the pressing cone disc and the transmission shaft, is mounted between the pressing cone disc of which the back is provided with the end surface cam pressing mechanism and the corresponding transmission shaft.

5. The continuously variable transmission with cone discs according to claim 1, wherein an elastic axial pressing element is arranged between the end surface cam pressing mechanism and the corresponding pressing cone disc.

6. The continuously variable transmission with cone discs according to claim 1, wherein an elastic axial pressing element is arranged between the end surface cam pressing mechanism and the corresponding transmission shaft.

7. The continuously variable transmission with cone discs according to claim 1, wherein the pair of driving cone discs and the pair of driven cone discs are respectively connected by splines.

8. The continuously variable transmission with cone discs according to claim 1, wherein the pair of driving cone discs and the pair of driven cone discs are respectively connected by ball keys.

9. The continuously variable transmission with cone discs according to claim 1, wherein the driving cam and a corresponding transmission shaft can be connected by a spline.

10. The continuously variable transmission with cone discs according to claim 1, wherein the driving cam and a corresponding transmission shaft can be connected by a ball key or a flat key.

11. The continuously variable transmission with cone discs according to claim 1, wherein the driven cam and a corresponding transmission shaft can be connected by a spline.

12. The continuously variable transmission with cone discs according to claim 1, wherein the driven cam and a corresponding transmission shaft can be connected by a ball key or a flat key.

13. A continuously variable transmission with cone discs, comprising a pair of driving cone discs mounted on a driving shaft and a pair of driven cone discs mounted on a driven shaft, wherein the pair of driving cone discs and the pair of driven cone discs are respectively connected by a manner that allow mutual axial sliding without mutual rotation of two cone discs;
the driving cone discs and the driven cone discs clamp a flexible transmission element, wherein the pair of driving cone discs includes a driving movable cone disc and a driving pressing cone disc; the pair of driven cone discs includes a driven movable cone disc and a driven pressing cone disc; a back of the cone and flexible element pressing surface of at least one pressing cone disc between the driving and the driven pressing cone disc is provided with an end surface cam pressing mechanism; the end surface pressing mechanism comprises a driving cam and a driven cam which are axially and oppositely arranged, wherein the driving cam and a corresponding transmission shaft can be fixedly connected, while the driven cam and a corresponding transmission shaft can be connected by a manner allowing mutual axial sliding without mutual rotation; the pressing cone disc of which the back is provided with the end surface cam pressing mechanism is connected with the corresponding transmission shaft in such way, which allows both mutual axial sliding within circa 1 mm and mutual rotation; or the pressing cone disc of which the back is not provided with an end surface cam pressing mechanism is fixedly connected with the corresponding transmission shaft, and
wherein the continuously variable transmission with cone discs is provided with a ratio control mechanism which drives the transmission shafts of the driving movable cone disc and the driven movable cone disc to axially slide synchronously at the same speed and in the same direction.

14. The continuously variable transmission with cone discs according to claim 13, wherein an elastic axial pressing element is arranged between the end surface cam pressing mechanism and the corresponding pressing cone disc.

15. A continuously variable transmission with cone discs, comprising a pair of driving cone discs mounted on a driving shaft and a pair of driven cone discs mounted on a driven shaft, wherein the pair of driving cone discs and the pair of driven cone discs are respectively connected by a manner that allow mutual axial sliding without mutual rotation of two cone discs; the driving cone discs and the driven cone discs clamp a flexible transmission element,
wherein the pair of driving cone discs includes a driving movable cone disc and a driving pressing cone disc; the pair of driven cone discs includes a driven movable cone disc and a driven pressing cone disc; a back of the cone and flexible element pressing surface of at least one pressing cone disc between the driving and the driven pressing cone disc is provided with an end surface cam pressing mechanism; the end surface pressing mechanism comprises a driving cam and a driven cam which are axially and oppositely arranged, wherein the driving cam and a corresponding transmission shaft can be connected by a manner allowing mutual axial sliding without mutual rotation, while the driven cam and a corresponding transmission shaft can be connected fixedly; the pressing cone disc of which the back is provided with the end surface cam pressing mechanism is connected with the corresponding transmission shaft in such way, which allows both mutual axial sliding within circa 1 mm and mutual rotation; or the pressing cone disc of which the back is not provided with an end surface cam pressing mechanism is fixedly connected with the corresponding transmission shaft, and
wherein the continuously variable transmission with cone discs is provided with a ratio control mechanism which drives the transmission shafts of the driving movable cone disc and the driven movable cone disc to axially slide synchronously at the same speed and in the same direction.

16. The continuously variable transmission with cone discs according to claim 15, wherein an elastic axial pressing element is arranged between the end surface cam pressing mechanism and the corresponding transmission shaft.

* * * * *